Dec. 30, 1958 J. MATARESE 2,866,922

COMMUTATOR

Filed June 20, 1957 3 Sheets-Sheet 1

INVENTOR.
JOHN MATARESE

BY Theodore Jay Jr.

ATTORNEY

Dec. 30, 1958 J. MATARESE 2,866,922

COMMUTATOR

Filed June 20, 1957 3 Sheets-Sheet 2

INVENTOR.
JOHN MATARESE

BY [signature]

ATTORNEY

Dec. 30, 1958 J. MATARESE 2,866,922

COMMUTATOR

Filed June 20, 1957 3 Sheets-Sheet 3

INVENTOR.
JOHN MATARESE

BY Theodore Jay Jr.

ATTORNEY

United States Patent Office 2,866,922

Patented Dec. 30, 1958

2,866,922

COMMUTATOR

John Matarese, Bronx, N. Y., assignor to Sylvania Electric Products Inc., a corporation of Massachusetts Application June 20, 1957, Serial No. 666,880

17 Claims. (Cl. 315—169)

My invention is directed toward electroluminescent image display devices.

Certain types of phosphors, when under the influence of an externally applied electric field, will luminesce, the intensity of the emitted light being a function of the strength of this applied field. Consequently, films or layers formed from such phosphors can be used as transducers to transform electrical energy to light energy. Phosphors of this type are said to be electroluminescent.

It is known that first and second mutually orthogonal (for example, horizontal and vertical) arrays of parallel, separated, electrical conductors can be positioned on each side of such a film or layer to form a crossed-grid structure wherein a portion of the film (defined as a cell) is connected between one horizontal conductor and one vertical conductor. When a suitable voltage is applied between any one horizontal-vertical conductor pair, the cell connected between this pair will luminesce to a degree dependent upon the magnitude of this voltage.

Further, it has been proposed to switch or commutate these applied voltages in such manner as to successively energize each cell in turn, thus producing an effect analogous to the cathode ray tube scanning operation as developed in a television receiver.

It is an object of the present invention to improve apparatus for applying switching or commutating voltages to a crossed-grid structure.

Another object is to utilize a circuit employing a plurality of rectifiers and multiposition switches in applying switching or commutating voltage to a crossed-grid structure.

Still another object is to provide new and improved switching or commutating circuits which utilize a first plurality of multiposition switches and a second plurality of rectifiers.

These and other objects of the invention will either be explained or will become apparent hereinafter.

In accordance with the principles of my invention, there is provided a crossed-grid electroluminescent structure having first and second separated arrays of parallel, separated,, electrical conductors, the first array conductors being oriented at an angle other than zero with respect to the second array conductors.

Each conductor in each array is connected in series with a rectifier to form a separate corresponding circuit, each circuit being coupled between corresponding first and second terminals. There are a plurality of $(wx)$ different conductors in the first array and another plurality of $(yz)$ different conductors in the second array wherein $w$, $x$, $y$ and $z$ are any integers larger than 1. If desired, $w$ can be equal to $x$ and $y$ can be equal to $z$, and further $w$, $x$, $y$, and $z$ can all be equal.

Thus, there are $(wx)$ different circuits in the first array; these circuits are arranged into $w$ different groups, each group containing $x$ different circuits. $w$ different third terminals are associated with the first array circuits, there being one group associated with each third terminal. Further, $x$ different fourth terminals are associated with the first array circuits, there being one circuit in each of said $w$ groups corresponding to each fourth terminal. Each third terminal is coupled to all first terminals in its corresponding group. Each fourth terminal is coupled to the second terminal of all its corresponding circuits. Hence, when one particular third terminal and one particular fourth terminal are specified, only one particular conductor and its associated rectifier will be connected therebetween.

First switching means coupled between all third and fourth terminals associated with the first array establish a first potential for the one first array conductor connected between a selected third terminal and a selected fourth terminal, and, simultaneously establish a second and different potential for all other first array conductors.

Similarly, there are $(yz)$ different circuits in the second array which are connected between $y$ different third terminals and $z$ different fourth terminals in the same manner as above. Second switching means coupled between all third and fourth terminals associated with the second array establish a third potential for the one second array conductor connected between a selected third terminal and a selected fourth terminal, and simultaneously establish said second potential for all other second array conductors.

Thus, when the difference between the first and third potentials is sufficiently high, the cell connected between the said one first array conductor and the said one second array will luminesce. Each of the switching means can respond to successive pulses in appropriate pulse trains to establish an appropriate first or third potential for each conductor in the corresponding array in turn in a predetermined sequence, while simultaneously establishing the second potential for all other conductors in both arrays.

When each of the first, second and third potentials is maintained at a different fixed value, the value of the second potential being intermediate the first and third potentials, each electroluminescent cell will be successively energized to the same degree.

Alternatively, the difference between the first and third potentials need not be constant but can be varied in accordance with a first signal, as for example a video type signal of given polarity, while the difference between the second and third potentials can vary in accordance with a second signal, opposed in polarity to the first signal but otherwise identical thereto. Under these conditions, each electroluminescent cell will be successively energized as before, but the degree of luminescence of each energized cell will depend upon the value of the signals applied across the energized cell.

For relatively low switching speeds, the first and second switching means can take various forms, as, for example, electromechanical stepping switches. For higher switching speeds, electronic switching tubes can be employed as hereinafter described.

Illustrative embodiments of my invention will now be described with reference to the accompanying drawings, wherein Fig. 1 shows a known type of crossed-grid structure;

Figure 1:
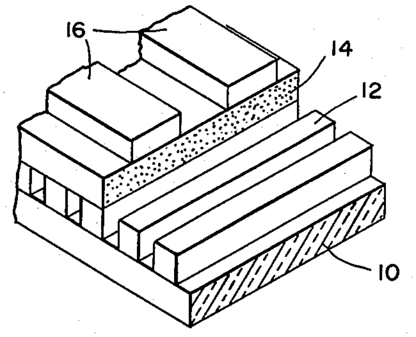

Referring now to the drawings, Fig. 1 shows a known crossed-grid structure comprising a glass plate 10, a first array of horizontal, transparent electrical conductors 12, an electroluminescent layer 14, and a second array of vertical electrical conductors 16.

Figure 2:
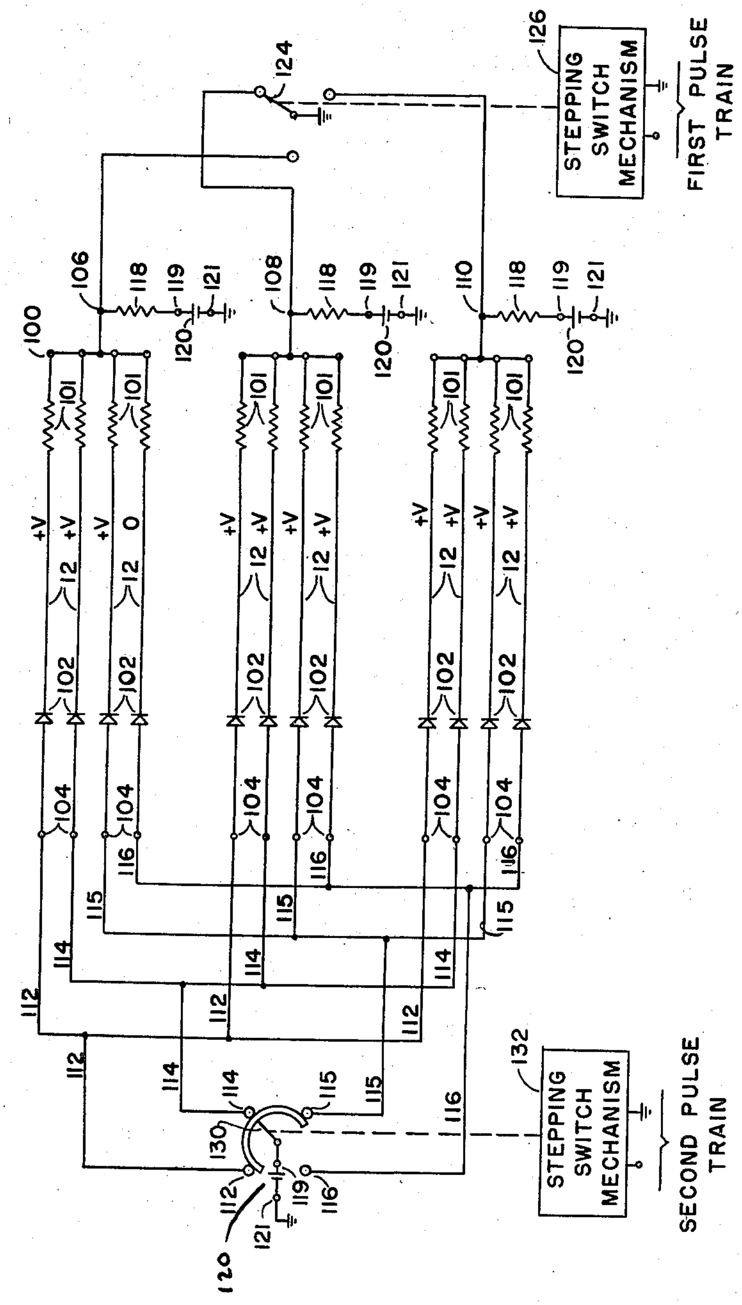
Fig. 2 illustrates one embodiment of my invention employing electromechanical stepping switches.

As shown in Fig. 2, there are $wx$ conductors 12 in the first array wherein, in this example $w=3$ and $x=4$. One of each conductor 12 is connected through a corresponding resistor 101 to a corresponding first terminal 100 and the other end is connected through a corresponding rectifier 102 to a corresponding second terminal 104, thus forming a series circuit. (All diodes are poled in the same sense.) The twelve different circuits are divided into three different groups, each group containing four different circuits.

Further, there are provided three different third terminals 106, 108 and 110, one group being associated with each third terminal, and four different fourth terminals 112, 114, 115 and 116, there being one circuit in each of said three groups corresponding to each fourth terminal. Each third terminal is coupled to all first terminals in the corresponding group; for example, terminal 106 is coupled to the first four adjacent terminals 100. Each fourth terminal is coupled to the second terminals of all of its corresponding circuits; for example, terminal 112 is coupled to the first, fifth and ninth terminals 104.

Each third terminal 106, 108 and 110 is connected through a resistor 118 and terminals 119 and 121 to ground. A battery 120 can be connected between each pair of terminals 119 and 121 with the polarity indicated to supply a direct voltage of $+V$ or alternatively, a video type signal of positive polarity can be applied between terminals 119 and 121.

Terminals 106, 108 and 110 form fixed contacts of a stepping switch. The position of the stepping switch arm 124 (which is grounded) is controlled by a conventional stepping switch mechanism 126. Incoming pulses in a first pulse train are supplied to switch mechanism 126. Each time a pulse is supplied to the mechanism, the stepping switch arm 124 is advanced one step.

Terminals 112, 114, 115 and 116 form fixed contacts of a stepping switch. The switch arm 130 of this switch is coupled through terminal 119, battery 120 and terminal 121 to ground, the arm being designed to always connect three adjacent terminals of the four terminals 112, 114, 115 and 116. The position of switch arm 130 is controlled by switch mechanism 132. Incoming pulses in a second pulse train are supplied to switch mechanism 132, the arm 130 being advanced one step each time a pulse is supplied to mechanism 132. The first pulse in the first train arrives at mechanism 126 at the same time the first pulse in the second train arrives at mechanism 132. The recurrence frequency of the second train is four times as large as the recurrence frequency of the first train so that arm 130 rotates four times as fast as arm 124.

When the switch arms are in the positions shown, one selected conductor 12 connected between terminals 106 and 112 will be at ground potential while all other conductors 12 will be at substantially $+V$ potential. Note that rectifiers 102 serve to prevent interconnections between conductor 12 which otherwise would destroy the desired potential distribution.

The circuit of Fig. 2 will function in the same manner if the positions of the rectifiers 102 and resistors 101 are reversed, providing that the rectifiers are connected in reverse sense.

The same circuit as in Fig. 2 can be used for the second array conductors provided that the battery connections are reversed, and the rectifiers are poled in reverse sense. Under these conditions, one selected cell (i. e. the cell connected between the one selected first array conductor and the one selected second array conductor which are at ground potential) will be dark, while all other cells will be illuminated, since all unselected first array conductors are at a potential of $+V$ and all unselected second array conductors will be at a potential of $-V$.

By suitably adjusting the recurrence frequencies of the pulse trains supplied to stepping switches coupled to both arrays, each cell associated with one horizontal conductor can in turn be deenergized before the cells in the adjacent horizontal conductor are energized, thus producing a switching effect analogous to the scanning of a dark trace cathode ray tube. However, it is desirable to illuminate one selected cell while causing all other cells to remain dark, thus producing a switching effect analogous to the scanning ray operation employed in television.

Figure 3:
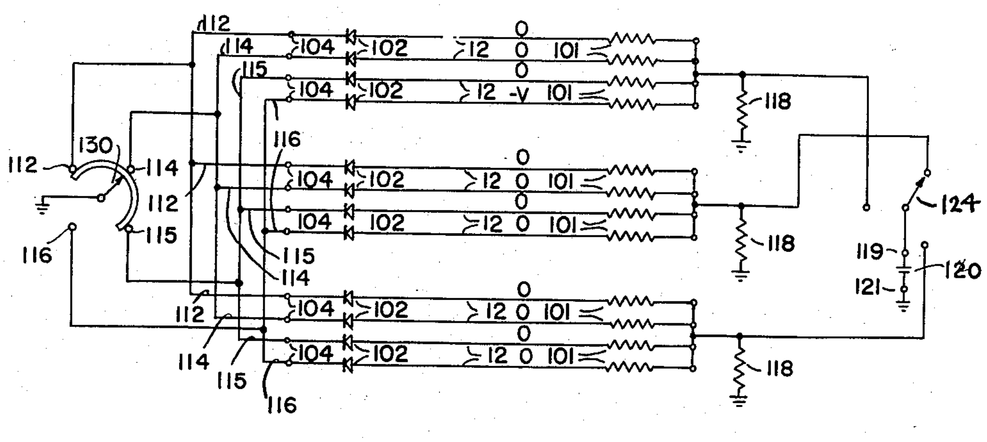
Figs. 3 and 4 are modifications of the embodiment of Fig. 2.

This can be accomplished by modifying the circuit of Fig. 2 in the manner shown in Fig. 3. It will be noted that Fig. 3 differs from Fig. 2 only in that the switch arm 124 is coupled through battery 121 to ground rather than being grounded, switch arm 130 and resistors 118 are grounded directly rather than through battery 120, and diodes 102 are connected in reverse sense.

When the switch arms are in the positions shown in Fig. 3, one selected conductor 12 connected between terminals 106 and 112 will be at substantially $+V$ potential, while all other conductors 12 will be at ground potential.

When the circuit of Fig. 3 is used for the second array conductors, the battery connections being reversed and the rectifiers being poled in reverse sense, one selected cell is illuminated while all other cells are dark. The desired switching effect can then be produced in the manner indicated previously. When the circuit uses batteries 120, all cells are successively energized to the same degree. On the other hand, when a video signal source is substituted for the batteries, the degree of luminescence of each cell will depend upon the value of the signals applied across the energized cell. Note that the video signal, as in conventional, has a given polarity which corresponds to the polarity of the battery. Thus, for the first array conductors, the video signal applied thereto will have positive polarity, while the video signal applied to the second array will have negative polarity, the video signals differing only in polarity and being otherwise identical.

Figure 4:
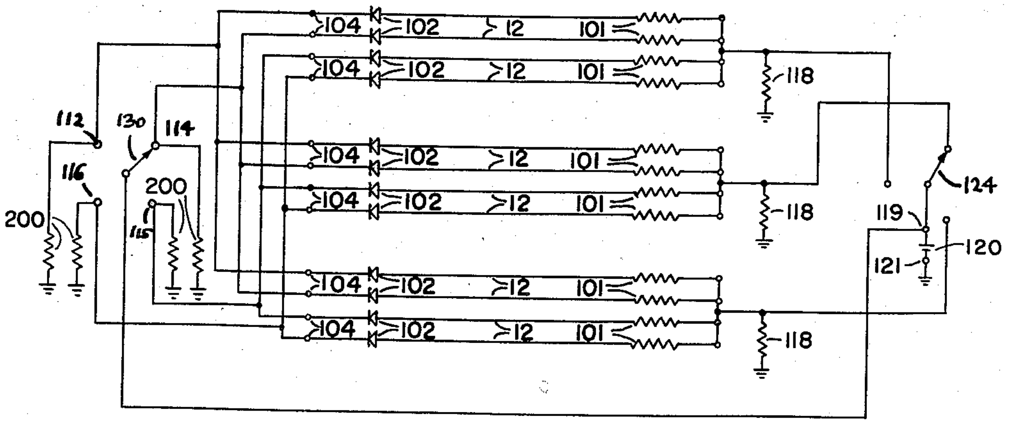

Fig. 4 shows a modification of the circuit of Fig. 3 in which the switch arm 130 can only be connected to one terminal rather than to three adjacent terminals. Note that both switch arm 130 and arm 124 are grounded through battery 120 and that each of terminals 112, 114, 115 and 116 is grounded through a resistor 200. The resistors 118 and 200 are substantially smaller than resistors 101.

Figure 5:
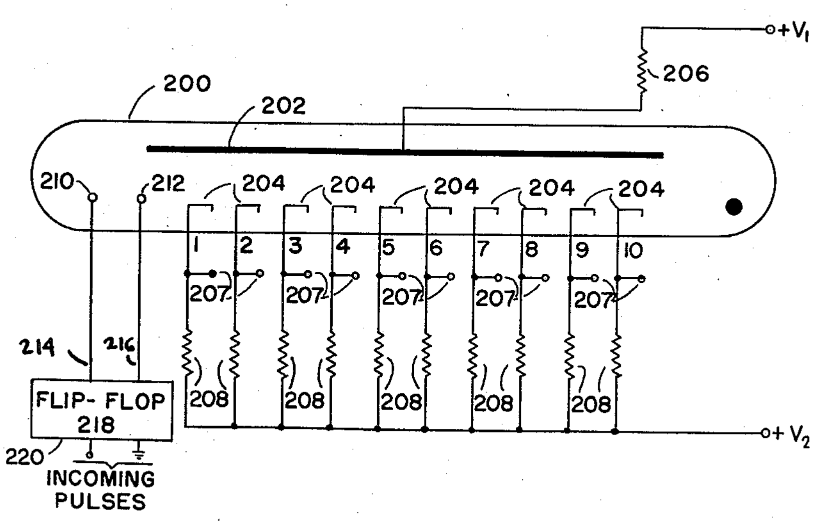
Fig. 5 illustrates an electronic switching device which can be substituted for the stepping switches of Fig. 4.

The stepping switches shown in Fig. 4 are extremely useful for applications requiring relatively low switching speeds. However, for relatively high speed switching applications, it is necessary to substitute electronic switching or commutation devices for the stepping switches shown previously. One known electronic device is shown in Fig. 5. There is provided a tube (known to the art as a decade counter) of the type commercially known as RETMA type and designated as a 6910. This tube comprises a gas filled envelope 200 in which is mounted a single anode 202 and a plurality of cathodes, in this example ten cathodes 204. The anode is connected through a resistor 206 to a point of high positive potential, and the cathodes are connected through corresponding resistors 108 to a second and lower point of positive potential. Each junction 207 between each cathode and its corresponding resistor corresponds to a different fixed contact of a stepping switch in Figs. 2, 3 and 4. In addition to the anodes and cathodes, the tube further contains two switching electrodes 210 and 212 which, in turn, are coupled to corresponding output terminals 214 and 216 of a flip flop circuit 218.

Initially the tube is non-conductive, and all of the junctions 207 are at the same potential. Upon the arrival of a pulse at the input terminal 220 of flip flop 218, the tube is rendered conductive, the only conductive path within the tube being established between the anode 202 and the first cathode 204. The potential at the junction 207 of the first cathode then rises relative to the potential at all other junctions. The arrival of the next successive pulse causes a conductive path to be established between the second cathode 204 and anode 202, and extinguishes the conductive path between the first cathode and the anode. The potential at the junction 207 of the first cathode then drops to its original value, and the potential at the junction 207 of the second cathode rises. This process continues until a conductive path is established between the tenth cathode and the anode. At this point, the entire switching process repeats itself. Hence, it will be apparent that the electronic device of Fig. 5 functions in the same manner as the stepping switches but the electronic device of Fig. 5 operates at a much higher frequency rate.

Similarly, a stepping switch of Fig. 4 can be replaced by a second type of tube which is provided with a plurality of anodes and a single cathode, the junctions corresponding to the fixed contacts of the switch being coupled to the corresponding anodes rather than cathodes as shown in Fig. 5. The operation is essentially the same except that the potential at a junction coupled to an anode is lowered when a conductive path is established between the cathode and the anode. Such a second type can be, for example, of the type commercially designated as a 6700 (known to the art as a magnetron beam switching tube).

It will be obvious to those skilled in the art that any desired switching sequence can be used and indeed manual switching operations can be performed as required.

While I have shown and pointed out my invention as applied above, it will be apparent to those skilled in the art that many modifications can be made within the scope and sphere of my invention as defined in the claims which follow.

What is claimed is:

1. In combination, $(wx)$ different circuits, $w$ and $x$ being integers larger than 1, each circuit being provided with an electrical conductor and a rectifier connected in series between first and second terminals, all rectifiers being poled in the same sense, said circuits being arranged into $w$ different groups, each group containing $x$ different circuits; $w$ different third terminals, there being one group corresponding to each third terminal, each third terminal being coupled to all first terminals in its corresponding group; and $x$ different fourth terminals, there being one circuit in each of said groups corresponding to each fourth terminal, each fourth terminal being coupled to the second terminals of all of its corresponding circuits.

2. The combination as set forth in claim 1, wherein $w$ and $x$ are equal.

3. In combination, $(wx)$ different circuits, $w$ and $x$ being integers larger than 1, each circuit being provided with an electrical conductor and a rectifier connected in series between first and second terminals, all rectifiers being poled in the same sense, said circuits being arranged into $w$ different groups, each group containing $x$ different circuits; $w$ different third terminals, there being one group corresponding to each third terminal, each third terminal being coupled to all first terminals in its corresponding group; $x$ different fourth terminals, there being one circuit in each of said groups corresponding to each fourth terminal, each fourth terminal being coupled to the second terminals of all of its corresponding circuits; and means coupled between said third and fourth terminals to establish a first potential level for one selected circuit conductor and establish a second and different potential level for all unselected circuit conductors.

4. The combination as set forth in claim 3, wherein said first level is more positive than said second level.

5. The combination as set forth in claim 3, wherein said second level is more positive than said first level.

6. In combination, $(wx)$ different circuits, $w$ and $x$ being integers larger than 1, each circuit being provided with an electrical conductor and a rectifier connected in series between first and second terminals, all rectifiers being poled in the same sense, said circuits being arranged into $w$ different groups, each group containing $x$ different circuits; $w$ different third terminals, there being one group corresponding to each third terminal, each third terminal being coupled to all first terminals in its corresponding group; $x$ different fourth terminals, there being one circuit in each of said groups corresponding to each fourth terminal, each fourth terminal being coupled to the second terminals of all of its corresponding circuits; and means responsive to an incoming signal and coupled between said third and fourth terminals to establish a first potential level for one selected circuit conductor and establish a second and different potential level for all unselected circuit conductors, one of said levels having a fixed value, the other of said levels varying in accordance with said signal.

7. The combination as set forth in claim 6, wherein said means establishes said first level for each circuit conductor in turn in a predetermined sequence.

8. In combination, $(wx)$ different circuits, $w$ and $x$ being integers larger than 1, each circuit being provided with an electrical conductor and a rectifier connected in series between first and second terminals, all rectifiers being poled in the same sense, said circuits being arranged into $w$ different groups, each group containing $x$ different circuits; first commutation means provided with $w$ different third terminals, there being one group corresponding to each third terminal, each third terminal being coupled to all first terminals in its corresponding group, said first means, when activated, applying a first potential to a selected third terminal while applying a second potential to all unselected third terminals; second commutation means provided with $x$ different fourth terminals, there being one circuit in each of said groups corresponding to each fourth terminal, each fourth terminal being coupled to the second terminals of all of its corresponding circuits, said second means, when activated, applying said first potential to a selected fourth terminal while applying said second potential to all unselected third terminals.

9. In combination, first and second arrays respectively composed of $(wx)$ and $(yz)$ different circuits, $w$, $x$, $y$, and $z$ being integers larger than 1, each circuit being provided with an electrical conductor and a rectifier connected in series between first and second connection points, the rectifiers in said array being poled in the same sense, the rectifiers in said second array being poled in opposite sense with respect to said first array rectifiers, the circuits in said first and second arrays being respectively arranged into $w$ groups of $x$ different circuits and $y$ groups of $z$ different circuits; first and second terminal sets respectively composed of $w$ different and $y$ different terminals, there being one $w$ group corresponding to each first set terminal and one $y$ group corresponding to each second set terminal, each terminal in said first and second sets being coupled to all first connection points in its corresponding group; third and fourth terminal sets respectively composed of $x$ different and $z$ different terminals, there being one circuit in each of said $w$ groups corresponding to each third set terminal and one circuit in each of said $y$ groups corresponding to each fourth set terminal, each terminal in said third and fourth sets being coupled to the second connection points of all of its corresponding circuits; and means coupled between all four terminal sets to establish a predetermined potential difference between a selected circuit conductor in said first array and a selected circuit conductor in said second array.

10. The combination as set forth in claim 9 further including an electroluminescent layer, said first array circuit conductors being in contact with a surface of said layer, said second array circuit conductors being in contact with an opposite surface of said layer, all conductors in said first and second arrays extending in corresponding first and second directions, said directions differing from each other.

11. In combination, $(wx)$ different circuits, $w$ and $x$ being integers larger than 1, each circuit being provided with an electrical conductor and a rectifier connected in series between first and second terminals, all rectifiers being poled in the same sense, said circuits being arranged into *w* different groups, each group containing *x* different circuits; *w* different third terminals, there being one group corresponding to each third terminal, each third terminal being coupled to all first terminals in its corresponding group; *x* different fourth terminals, there being one circuit in each of said groups corresponding to each fourth terminal each fourth terminal being coupled to the second terminals of all of its corresponding circuits; first means coupled to said third terminals to establish a first potential at a selected third terminal and establish a second potential at all unselected third terminal; second means coupled to said fourth terminals to establish said first potential at a selected fourth terminal and to establish said second potential to all unselected fourth terminals whereby the one conductor coupled between the selected third and fourth terminals attains said first potential and all other conductors attain said second potential; and third means coupled to said first and second means whereby said first potential is applied to each third terminal in turn in a first predetermined temporal sequence and said first potential is applied to each fourth terminal in turn in a second predetermined temporal sequence.

12. In combination, first and second electrical devices, each device comprising (*wx*) different circuits, *w* and *x* being integers larger than 1, each circuit being provided with an electrical conductor and a rectifier connected in series between first and second terminals, all rectifiers being poled in the same sense, said circuits being arranged into *w* different groups, each group containing *x* different circuits; *w* different third terminals, there being one group corresponding to each third terminal, each third terminal being coupled to all first terminals in its corresponding group; and *x* different fourth terminals, there being one circuit in each of said groups corresponding to each fourth terminal, each fourth terminal being coupled to the second terminals of all of its corresponding circuits, the rectifiers in said first device being poled opposite to the rectifiers in said second device; first means coupled between the third terminals of said first device and the third terminals of said second device to establish a first potential at a selected third terminal of said first device and to establish a second potential at a selected third terminal of said second device, said first means further establishing a third potential at the unselected third terminals of both devices; and second means coupled between the fourth terminals of said first device and the fourth terminals of said second device to establish said first potential at a selected fourth terminal of said first device and to establish said second potential at a selected fourth terminal of said second device, said second means further establishing said third potential at the unselected fourth terminals of both devices.

13. In combination, (*wx*) different circuits, *w* and *x* being integers larger than 1, each circuit being provided with an electrical conductor and a rectifier connected in series between first and second terminals, all rectifiers being poled in the same sense, said circuits being arranged into *w* different groups, each group containing *x* different circuits; *w* different third terminals, there being one group corresponding to each third terminal, each third terminal being coupled to all first terminals in its corresponding group; *x* different fourth terminals, there being one circuit in each of said groups correspodning to each fourth terminal, each fourth terminal being coupled to the second terminals of all of its corresponding circuits; first means coupled to said third terminals to apply a first voltage to a selected third terminal and apply a second voltage to all unselected third terminals; and second means coupled to said fourth terminals to apply a third voltage to a selected fourth terminal and to apply said second voltage to all unselected fourth terminals, only one circuit being connected both to said selected third terminal and said selected fourth terminal, the rectifier in said one circuit being rendered conductive, all other rectifiers being nonconductive.

14. In combination, (*wx*) different circuits, *w* and *x* being integers larger than 1, each circuit being connected in series between first and second terminals, said circuits being arranged into *w* different groups, each group containing *x* different circuits; *w* different third terminals, there being one group corresponding to each third terminal, each third terminal being coupled to all first terminals in its corresponding group; and *x* different fourth terminals, there being one circuit in each of said groups corresponding to each fourth terminal, each fourth terminal being coupled to the second terminals of all of its corresponding circuits.

15. In combination, (*wx*) different series circuits, *w* and *x* being integers larger than 1, each circuit being provided with a resistance, an electrical conductor and a rectifier and being connected between first and second terminals, all rectifiers being poled in the same sense, said circuits being arranged into *w* different groups, each group containing *x* different circuits; *w* different third terminals, there being one group corresponding to each third terminal, each third terminal being coupled to all first terminals in its corresponding group; and *x* different fourth terminals, there being one circuit in each of said groups corresponding to each fourth terminal, each fourth terminal being coupled to the second terminals of all of its corresponding circuits.

16. In combination, (*wx*) different series circuits, *w* and *x* being integers larger than 1, each circuit being provided with a resistance, an electrical conductor and a rectifier and being connected between first and second terminals, all rectifiers being poled in the same sense, said circuits being arranged into *w* different groups, each group containing *x* different circuits; *w* different third terminals, there being one group corresponding to each third terminal, each third terminal being coupled to all first terminals in its corresponding group; *x* different fourth terminals, there being one circuit in each of said groups corresponding to each fourth terminal, each fourth terminal being coupled to the second terminals of all of its corresponding circuits; and means coupled between said third and fourth terminals to establish a first potential level for one selected circuit conductor and establish a second and different potential level for all unselected circuit conductors.

17. In combination, (*wx*) different series circuits, *w* and *x* being integers larger than 1, each circuit being provided with a resistance, an electrical conductor and a rectifier and being connected between first and second terminals, all rectifiers being poled in the same sense, said circuits being arranged into *w* different groups, each group containing *x* different circuits; *w* different third terminals, there being one group corresponding to each third terminal, each third terminal being coupled to all first terminals in its corresponding group; *x* different fourth terminals, there being one circuit in each of said groups corresponding to each fourth terminal, each fourth terminal being coupled to the second terminals of all of its corresponding circuits; and means responsive to an incoming signal and coupled between said third and fourth terminals to establish a first potential level for one selected circuit conductor and establish a second and different potential level for all unselected circuit conductors, one of said levels having a fixed value, the other of said levels varying in accordance with said signal.

References Cited in the file of this patent

UNITED STATES PATENTS

| | | |
|---|---|---|
| 2,049,763 | De Forest | Aug. 4, 1936 |
| 2,136,441 | Karolus | Nov. 15, 1938 |
| 2,698,915 | Piper | Jan. 4, 1955 |
| 2,774,813 | Livingston | Dec. 18, 1956 |